Dec. 15, 1942.  A. H. WOLFERZ  2,305,125

TACHOMETER

Filed March 25, 1939

Inventor:
Alfred H. Wolferz,
By Potter, Pierce + Scheffler
Attorneys.

Patented Dec. 15, 1942

2,305,125

UNITED STATES PATENT OFFICE 2,305,125

TACHOMETER

Alfred H. Wolferz, Hillside, N. J., assignor to Weston Electrical Instrument Corporation, Newark, N. J., a corporation of New Jersey Application March 25, 1939, Serial No. 264,251

7 Claims. (Cl. 171—209)

This invention relates to magneto generators and more particularly to generators adapted for use as airplane engine tachometers.

It has been found that mechanical and electrical resonance in the magneto of an electrical tachometer may occur in ways which seriously affect the accuracy of reading. The indicator of an electrical tachometer responds as a function of the peak voltage delivered by the magneto and the accuracy of the readings therefore depends upon this peak voltage being a function of the speed of rotation. At low speeds, the rotor tends to travel in a succession of high speed pulses as the rotor poles move from one set of stator poles to the adjacent set. Mechanical resonance of the rotor may combine with this pulsating resistance to rotation, within certain ranges of engine speeds, to produce a pulsating rotation that results in peak voltages substantially higher than the peak voltages corresponding to the uniform angular velocity of the rotor. The tachometer indications are too high within these ranges of engine speed and it is not practical to correct the error by a calibration of the indicator scale since the error varies with the play or flexibility in the driving connection, the frequency of vibration of the engine, and other factors that may differ for each installation.

An object of this invention is to provide a tachometer magneto generator of novel design that substantially eliminates a pulsating or irregular rotation of the motor at all operating speeds. An object is to provide a magneto generator having a multipolar magnet rotating within a multipolar stator, and auxiliary poles in the gaps between adjacent poles of the stator; the auxiliary poles affording a secondary magnetic circuit substantially in a plane or planes parallel to the axis of the stator, i. e., at right angles to the main flux path through the radial pole pieces of the stator. A further object is to provide a magneto for use in a tachometer, the magneto including a laminated stator mounted between two end caps or shells, the stator having a plurality of radial poles, a permanent magnet rotor journalled in the end caps, and auxiliary pole pieces mounted on a ferromagnetic annulus that is secured to one end cap, the auxiliary poles extending longitudinally of the axis of the rotor to provide a secondary path for the magnetic flux at right angles to the main path through the radial poles of the stator.

Other objects and advantages of this invention will appear from the following specification when taken in connection with the accompanying drawing in which.

Figures 1, 2, 3, 4:
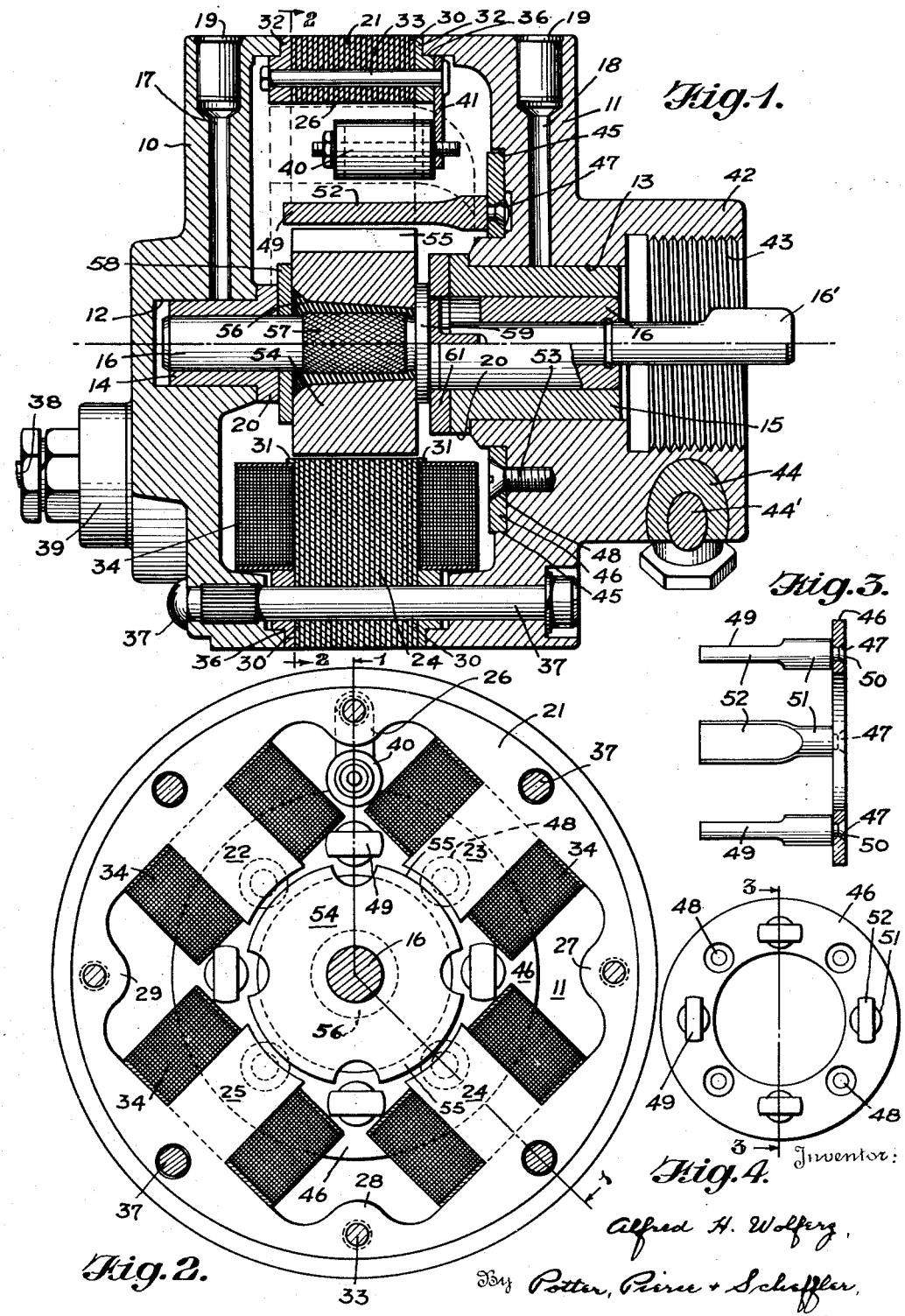
Fig. 1 is an irregular longitudinal cross-section of a device incorporating features of this invention, taken on the line 1—1 of Fig. 2.
Fig. 2 is a transverse cross-section, partly in elevation, substantially along line 2—2 of Fig. 1.
Fig. 3 is a sectional view of the interpole ring on line 3—3 of Fig. 4.
Fig. 4 is an end elevation of the interpole assembly.

The particular embodiment that is shown on an enlarged scale in the drawing was designed for mounting directly on the casing of an airplane engine but the invention may be incorporated in tachometer generators of larger size and/or of different design.

In the drawing, the reference numerals 10, 11 identify the end shells of the magneto casing that have central bores 12, 13 in which bearing sleeves 14, 15, respectively, are mounted. The rotor shaft 16 is journalled in the bearing sleeves and is counterbored at its inner end to receive the splined coupling member 16'. Oil passages 17, 18 are provided in the end sleeves for the lubrication of the bearings, the passages being closed by the usual covers or caps 19. Radial flanges 20 on the bearing sleeves 14, 15 are accurately spaced from each other to serve as thrust bearings for centering the rotor within the stator.

The stator comprises soft iron laminations 21 of approximately annular form having inwardly projecting polar portions 22—25 alternating with projections 26—29 that are apertured to receive the assembly bolts. The outer laminations 30 are made of a pliable material, such as brass, so that the tips 31 may be bent outward for anchoring the field coils upon the pole pieces. Flanged end rings 32 are positioned at each side of the group of laminations and bolts 33 extend through the openings in the enlarged portions 26—29 to provide a rigid stator assembly. A series of coils are mounted on the pole pieces 22—25 and, as noted above, are held in place by the bent tips 31 of the outer laminations.

The end shells or caps 10, 11 have accurately formed annular faces 36 that seat upon the flanged end rings 32 of the stator unit to form the casing of the magneto. A series of bolts 37 extend through the end shells and the stator to clamp the parts of the assembly together.

A pair of electrical terminals 38 on the outer shell 10 extend through the insulating bushings 39. A temperature compensating unit 40 is mounted on a strap 41 that is fixed to the stator unit. The unit 40 preferably includes a resistor of substantially zero temperature-resistance coefficient and a resistor of relatively high temperature-resistance coefficient that are connected, as described in the patent to Burchard P. Romain, No. 1,816,748, in series and in shunt, respectively, with the magneto terminals.

The inner shell 11 terminates in a sleeve or boss 42 that has interior threads 43 for mounting the magneto directly upon the airplane engine. The splined end of the connecting member 16' projects beyond the boss 42 for engagement with the engine tachometer shaft when the driving connection is established, and the magneto casing is locked from turning by a copper bushing 44 that is wedged into the threads of the tachometer outlet by the bolt 44'.

The inner face of the end shell 11 has an annular recess 45 for receiving the soft iron annulus or yoke 46 of a secondary stator assembly that cooperates with the magnetized rotor to complete a magnetic circuit effectively in a plane parallel to the axis of the stator. The annulus 46 has two groups of oppositely countersunk apertures 47, 48 for receiving, respectively, the secondary poles 49 that are secured to the annulus by their riveted ends 50 and screws for mounting the annulus. Each secondary pole is preferably a soft iron rod that is stamped or pressed to leave a short cylindrical section 51 adjacent the yoke 46 and a section 52 of approximately rectangular cross-section that is symmetrically arranged in the gap between adjacent polar extensions of the stator. The secondary pole assembly is mounted on the shell 11 by screws 53 that pass through the openings 48 of the annulus 46.

The rotor 54 is a permanent magnet having four salient poles 55 of alternate polarity that is secured by molded plastic material 56 to the knurled section 57 of the shaft 16. The plastic 56 may be a phenolic resin or similar insulating material that serves to break any magnetic circuit between the magnetized rotor and the shaft or casing. A washer 58 serves as a bearing plate between the rotor and the flange 20 of the bearing sleeve 14 and, at the other side of the rotor, the radial flange 59 of the shaft 16 seats against a washer 61 that rests against the flange 20 of the bearing sleeve 13.

The described construction substantially eliminates the pulsating rotation of the rotor at all engine speeds since the magnetic circuits through the secondary poles 49 and yoke 46 provide a secondary path, for the flux of the magnetized rotor, of substantially uniform conductance as the poles of the rotor move in succession from one polar extension to the other. The speed of the rotor agrees substantially with the engine tachometer shaft speed and the peak voltage output therefore varies as a definite function of the engine speed. It is to be noted that the secondary magnetic circuit can be added to existing tachometer generators, or incorporated in new generators, without increasing the dimensions of the apparatus. This is particularly important in the case of tachometers for use on aircraft as the bulk and weight of the generator are held to minimum values.

It is to be understood that the described embodiment is typical of the invention and that various modifications in the design and construction of the parts that may occur to those familiar with the art fall within the spirit of my invention as set forth in the following claims.

I claim:

1. In a tachometer, a magneto comprising a stator having a plurality of radial pole pieces, windings on said pole pieces, a rotor with circumferentially spaced poles rotatable within said stator, and a secondary magnetic flux path parallel to the axis of the rotor; said secondary path comprising a yoke spaced axially from said rotor, and a plurality of poles located between adjacent stator pole pieces and extending parallel to the axis of the rotor.

2. In a tachometer, a magneto comprising a laminated stator having four radial pole portions, a coil on each of said pole portions, end shells at either side of the stator, a four pole permanent magnet rotor supported within said stator, secondary poles extending axially between said stator poles, a yoke spaced axially from said rotor and supporting said secondary poles to form magnetic circuits for said rotor extending parallel to the axis of the rotor, means mounting said yoke upon one of said shells, and terminals for said coils on one of said shells.

3. In a tachometer, a magneto comprising a stator having a plurality of radial pole portions, a multipole magnetic rotor supported for rotation within said stator, and secondary stator means forming a flux path for said rotor transverse to and substantially independent of the flux path through said stator; said secondary stator means comprising secondary poles extending axially between adjacent pole portions of said stator, and a yoke spaced axially from said rotor and magnetically connecting said secondary poles.

4. In a tachometer, a magneto comprising a laminated stator having four radial pole portions, a coil on each of said pole portions, end shells at either side of said stator and cooperating therewith to form a casing, a four pole permanent magnet rotor within said stator and supported by said end shells, and a secondary stator providing for said rotor a flux path substantially independent of and at right angles to the flux path through said laminated stator, said secondary stator comprising elongated pole pieces extending axially between and spaced from the radial pole portions of said laminated stator, and a ferromagnetic yoke spaced from said rotor and magnetically coupling said elongated poles.

5. In a tachometer, a magneto comprising a stator having a plurality of radial pole portions, end shells at either side of said stator, a multipole rotor within said stator and supported on said shells, and means forming a secondary magnetic circuit for the flux of said rotor substantially independent of and transverse to the flux circuit through said stator; said means comprising a ferromagnetic ring secured to one of said end shells, and a plurality of secondary poles mounted upon said ring and extending axially between adjacent pole portions of said stator.

6. A tachometer magneto comprising a laminated soft iron stator having a plurality of radial pole portions, end shells at either side of said stator and cooperating therewith to form a casing, a multiple pole magnetized rotor within said stator and supported on said end shells, and means forming a secondary magnetic circuit for the flux of said rotor substantially independent of and transverse to the flux circuit through said stator; said means comprising soft iron poles extending axially in the gaps between adjacent pole portions of said stator, and an annular yoke of ferromagnetic material spaced axially from said rotor and supported on one of said end shells.

7. In a tachometer, a magneto having end shells and an interposed stator structure, said stator structure including a plurality of poles, windings on said poles, a permanent magnet structure having a plurality of poles, means supporting said rotor on said shells for rotation within said stator, a plurality of axially extending secondary poles in the gaps between said stator poles, and a ferromagnetic ring spaced axially from said rotor and mounted on an end shell, said ring supporting said secondary poles, thereby to establish a return flux path for said rotor substantially independent of and at right angles to the flux path through said stator.

ALFRED H. WOLFERZ.